United States Patent [19]

Midkiff et al.

[11] 4,253,954
[45] Mar. 3, 1981

[54] TWO-STAGE SPIN-ON SEPARATING DEVICE

[75] Inventors: David G. Midkiff; Rajan A. Jaisinghani, both of Stoughton, Wis.

[73] Assignee: Nelson Industries, Inc., Stoughton, Wis.

[21] Appl. No.: 54,300

[22] Filed: Jul. 2, 1979

[51] Int. Cl.³ .............................................. B01D 29/26
[52] U.S. Cl. .............................. 210/168; 210/DIG. 5; 210/315; 210/440; 210/493.1
[58] Field of Search ................. 210/168, DIG. 5, 340, 210/493 B, 420, 423, 440, 441, 315

[56] References Cited

U.S. PATENT DOCUMENTS

| | | | |
|---|---|---|---|
| 2,864,505 | 12/1958 | Kasten | 210/493 R UX |
| 3,164,506 | 1/1965 | Lake | 210/493 |
| 3,361,260 | 1/1968 | Buckman | 210/493 R |
| 3,456,800 | 7/1969 | Humbert, Jr. | 210/440 |
| 3,467,256 | 9/1959 | Humbert | 210/493 R |
| 3,502,218 | 3/1970 | Tuffnell et al. | 210/440 X |
| 3,557,957 | 1/1971 | Baldwin | 210/440 |
| 3,743,096 | 7/1973 | Harvey, Jr. et al. | 210/DIG. 17 |
| 3,862,037 | 1/1975 | Donaldson et al. | 210/168 |
| 3,929,643 | 12/1975 | Donaldson et al. | 210/168 |
| 4,168,237 | 9/1979 | Pivett et al. | 210/440 |

*Primary Examiner*—Theodore A. Granger
*Attorney, Agent, or Firm*—Andrus, Sceales, Starke & Sawall

[57] ABSTRACT

A disposable two-stage spin-on liquid separating device having particular use for separating water from hydrocarbon fuels. The device includes an outer casing having an open upper end which is enclosed by a cover assembly. The cover assembly includes a liquid inlet conduit and a liquid outlet conduit with one of said conduits being located axially of the cover assembly and having a threaded connection for attachment to a liquid flow system. Located within the casing is a two-stage separating unit composed of a coalescing assembly and a separator stage which is located downstream of the coalescing assembly. The coalescing assembly includes a coalescing element and upper and lower end caps are secured to the ends of the element. The peripheral edge of the upper end cap extends radially outward and is secured to the upper end of the separator stage. Attachment of the cover assembly in the casing acts to clamp the separating unit between the cover assembly and the bottom of the casing.

2 Claims, 6 Drawing Figures

TWO-STAGE SPIN-ON SEPARATING DEVICE

BACKGROUND OF THE INVENTION

Fuel water separators are used in conjunction with internal combustion engines to remove small traces of water from the hydrocarbon fuel. Certain fuel-water separating devices are two stage units in which the fuel initially passes through a coalescing element where the water droplets are coalesced into larger sized globules which flow by gravity from the downstream side of the coalescing element for collection in a sump. The finer water droplets carried by the fuel through the coalescing element are removed by the separator stage, and again also flow downwardly by gravity along the upstream side of the separator stage for collection in the sump.

In the past, fuel-water separators have been of relatively expensive, non-disposable construction in which the coalescing element must be replaced periodically.

Spin-on oil filters, in which the filter is threaded onto a nipple in the engine block, are known. Oil filters of this type are adapted to removed solid particles from the fuel and generally consist of a single separating stage.

SUMMARY OF THE INVENTION

The invention is directed to a disposable, spin-on type, two-stae fuel-water separator having particular use in vehicles, such as trucks, tractors, automobiles, and other mobile equipment. In accordance with the invention, the separator comprises a casing having an open upper end which is enclosed by a cover. Liquid inlet and outlet conduits are formed in the cover and one of the conduits is located axially of the cover and is provided with a threaded connection for attachment to a liquid flow system. Located within the casing is a two-stage separating unit which is composed of a annular coalescing assembly and a separator stage which is located downstream of the coalescing assembly.

The coalescing assembly includes a coalescing element and a pair of end caps which are secured by an adhesive to the opposite ends of the element. The peripheral edge of the upper end cap extends radially beyond the element and is secured to the upper end of the separating stage via an adhesive layer.

Attachment of the cover to the upper edge of the casing acts to clamp the two-stage separating unit between the cover and the bottom of the casing.

The separating device of the invention is of less expensive construction than fuel-water separators as used in the past and, as such, can be produced as a disposable package in which the entire unit can be removed and replaced with a new unit after a period of service.

The separating device of the invention is adapted for either "in-out" flow in which the fuel flows radially outward from a central inlet, or "out-in" flow in which the flow is reversed and is toward the axis of the unit. With "out-in" flow, the separating device can be attached to the engine block by merely threading the unit onto the engine block nipple, while with "in-out" flow a special adapter is employed to connect the separating device to the engine block nipple.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
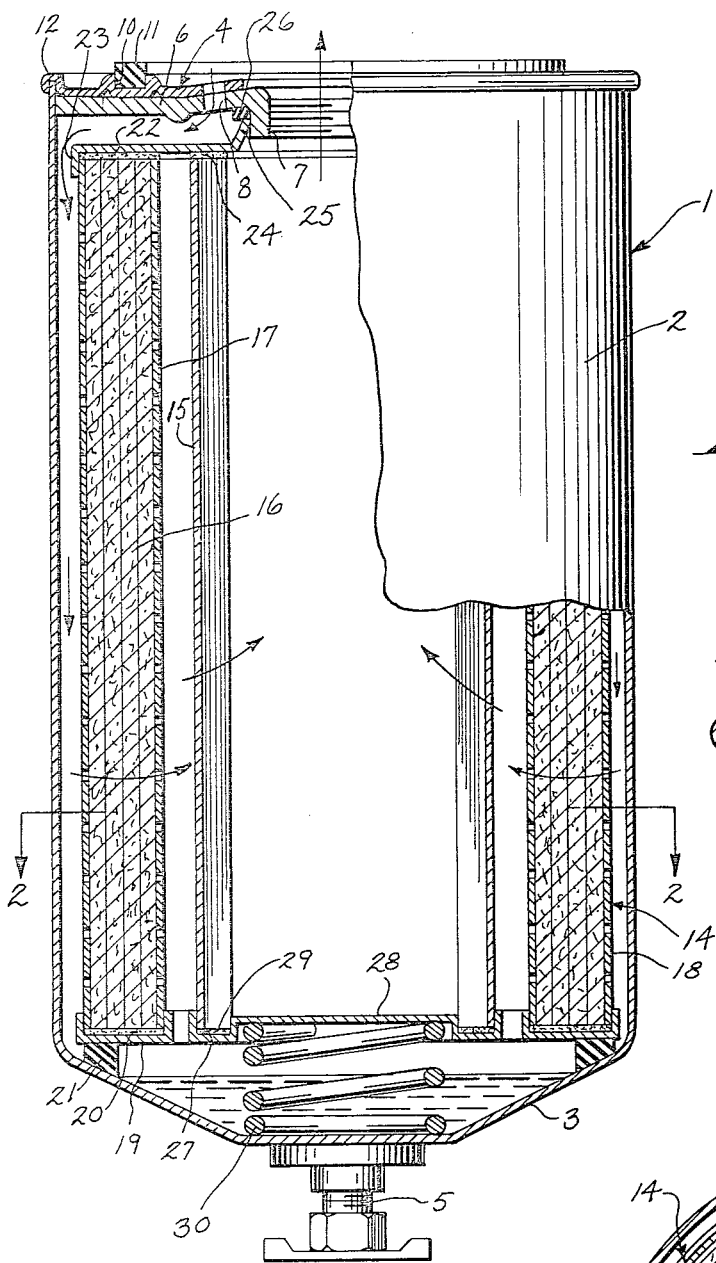
FIG. 1 is a side elevation of the separating device of the invention with parts broken away and utilizing out-in flow.
Figure 3:
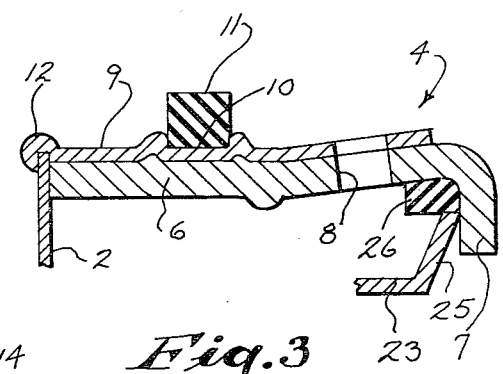
FIG. 3 is an enlarged fragmentary view showing the cover assembly.
Figure 2:
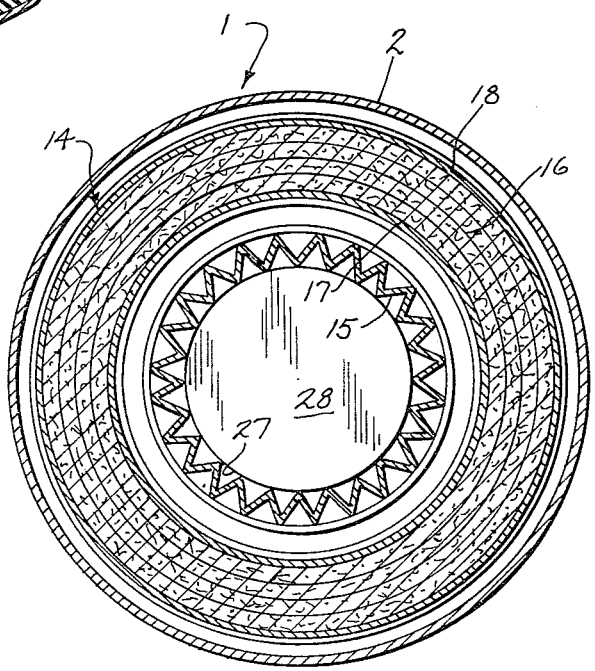
FIG. 2 is a section taken along line 2—2 of FIG. 1 with parts broken away.

FIGS. 1–3 show a liquid separating device having particular use in separating water from a hydrocarbon fuel. In the device shown in FIGS. 1–3, the fuel flows radially inward through the separating device in an out-in path.

The separating device comprises a casing 1 which includes a generally cylindrical shell 2 having an open upper end and a generally concave lower head 3. The open upper end is enclosed by a cover assembly indicated generally by 4.

To drain water which accumulates within the bottom portion of the casing, a drain opening is provided in head 3 which is enclosed by a threaded drain plug 5.

The cover assembly 4 consists of a cover plate 6 having a central threaded opening 7 and a series of outlet openings 8 which are disposed in a circular pattern and are concentric with the central opening 7. The opening 7 is adapted to be threaded onto a nipple on the engine block of the engine and serves as an inlet for the fuel to be treated. The outlet openings 8 are adapted to register with a groove in the engine block and serve to return the fuel to the engine block.

In addition to the cover plate 6, the cover assembly 4 also includes a sheet metal retainer 9 which is secured by welding to the upper surface of the cover plate. As shown in FIG. 3, the retainer 9 is formed with a circular groove 10 which receives a resilient gasket 11 that is adapted to seal the cover assembly against the surface of the engine block, not shown. To secure the cover assembly 4 to the shell 2, the peripheral edge 12 of the sheet metal retainer 9 is crimped to the edge as shown in FIG. 3.

Located within the casing 1 is a two-stage separating unit which is composed of an annular coalescing assembly 14 and an annular separator stage 15 which is spaced radially inward of the coalescing assembly.

The coalescing assembly 14 includes a coalescing element 16 which is enclosed on its inner surface by a perforated inner metal body 17 and is enclosed on its outer surface by a perforated metal outer body 18. The coalescing element 16 itself is a conventional type and forms no part of the present invention. In general, the coalescing element may consist of a series of layers of fibrous material having different porosities and densities which can serve to prefilter the fuel, as well as coalescing the water droplets into larger sized globules which will flow by gravity downward along the inner body 17 as the fuel emerges from the coalescing element.

An annular lower end cap 19 is secured to the lower end of the coalescing element 16 by a layer of an adhesive 20, such as a plastisol, and lower end cap 19 is separated from the lower head 3 by gasket ring or seal 21.

The upper end of the coalescing element 16 is secured through a layer of adhesive 22 to an upper end cap 23. As best shown in FIG. 2, the inner portion of the upper end cap 23 extends radially inward beyond the coalescing assembly 14 and is also attached to the upper end of the separator stage 15 through an adhesive layer 24.

The central portion of the upper cap 23 is provided with an annular flange 25, and the upper end of the flange 25 is sealed against the lower surface of the cover plate 6 by a gasket 26.

The lower end of the separating stage 15 is bonded within a circular groove 27 in base member 28 by adhesive layer 29 and a spring 30 is located between the central portion of base member 28 and the lower head 3. The force of spring 30 urges the separating stage upwardly to affect a tight seal between flange 25 and gasket 26.

The separator stage 15 is a conventional type and can be formed of pleated paper, as illustrated in FIG. 2, coated with a hydrophobic resin, such as a phenolic resin, or it can be composed of a perforated metal screen coated with a material, such as polytetrafluoroethylene. Small water droplets flowing through the coalescing element 16 will be separated from the hydrocarbon fuel by the separator stage 15 and will flow downwardly along the outer surface of the separator stage 15 for collection in the lower end of the casing 1.

To assembly the separating device of the invention, the lower end of the coalescing element 16 is bonded through the adhesive layer 20 to the lower end cap 19, and the lower end of the separating stage 15 is bonded through the adhesive layer 29 to the base member 28. Both the upper end of the coalescing element 16 and the upper end of the separator stage 15 are then bonded to the upper end cap 23 through the adhesive layers 22 and 24, respectively.

The gasket 21 is then bonded to lower end cap 19 and the entire pre-assembled structure, consisting of the coalescing element 16, the separator stage 15 and the upper and lower end caps 23, 19 and 28, is then positioned in the casing with the base member 28 bearing against the spring 30, and the gasket 21 bearing against the head 3. With the coalescer assembly 14 and the separator stage 15 positioned within the casing, the cover assembly 4 is placed across the open end of the casing with the gasket 26 bearing against the flange 25, and the periphery edge of the retainer 19 is crimped around the upper edge of the casing to complete the assembly.

The concave lower head 3 provides a dual function in that it not only aids in collecting water and sediment, but also is helpful in centering the pre-assembled coalescer assembly and separator stage within the casing.

While the drawings illustrate the lower end cap 19 and the base member 28 to be separate members, it is contemplated that they can be a unitary end structure with drainage holes located in the structure between the coalescing element 16 and the separator stage 15. The term "lower end cap structure" is intended to include a single end cap or separate end cap members, such as members 19 and 28 as shown in FIG. 1.

FIGS. 4-7 illustrate a modified form of the separating device of the invention in which the flow is in an "in-out" path, meaning that the liquid flows from the center of the casing radially outwardly. In this embodiment, the casing 1 has the identical construction as that described with respect to the first embodiment, and the open upper end of the casing is enclosed by a cover assembly 4 which has the same structure as that previously described.

Located within the casing 1 is an annular coalescing assembly 31, and a separator stage 32 is spaced radially outward of the coalescing assembly. The structure of both coalescing assembly 31 and the separator stage 32 is the same as that described with respect to the first embodiment.

The lower end of the coalescing assembly 31 is bonded to a lower end cap 33 through a layer of an adhesive 34, such as a plastisol. The central portion 35 of end cap 33 is offset upwardly and a spring 36, similar to spring 30, extends between central portion 36 and head 3.

The lower end of the separating stage 32, which has a construction similar to that of separator stage 15, is bonded within a channel-shaped ring 37 by a layer of adhesive 38 and a gasket 39 is positioned between the lower surface of ring 37 and the lower head 3. End cap 33 and ring 37 comprise a lower end cap structure.

Both the upper end of the coalescing assembly 31 and the upper end of the separating stage 32 are bonded to an upper end cap 40 through a layer of adhesive 41. With this construction, the coalescing assembly 31, the separating stage 32, lower ring 37 and end caps 33 and 40 comprise an integral pre-assembled structure.

As in the case of the first embodiment, the central portion of the upper end cap 40 is provided with a flange which borders the inlet opening 7 in the cover plate 6, and the upper end of the flange is sealed to the cover plate through a gasket 42.

Figure 4:
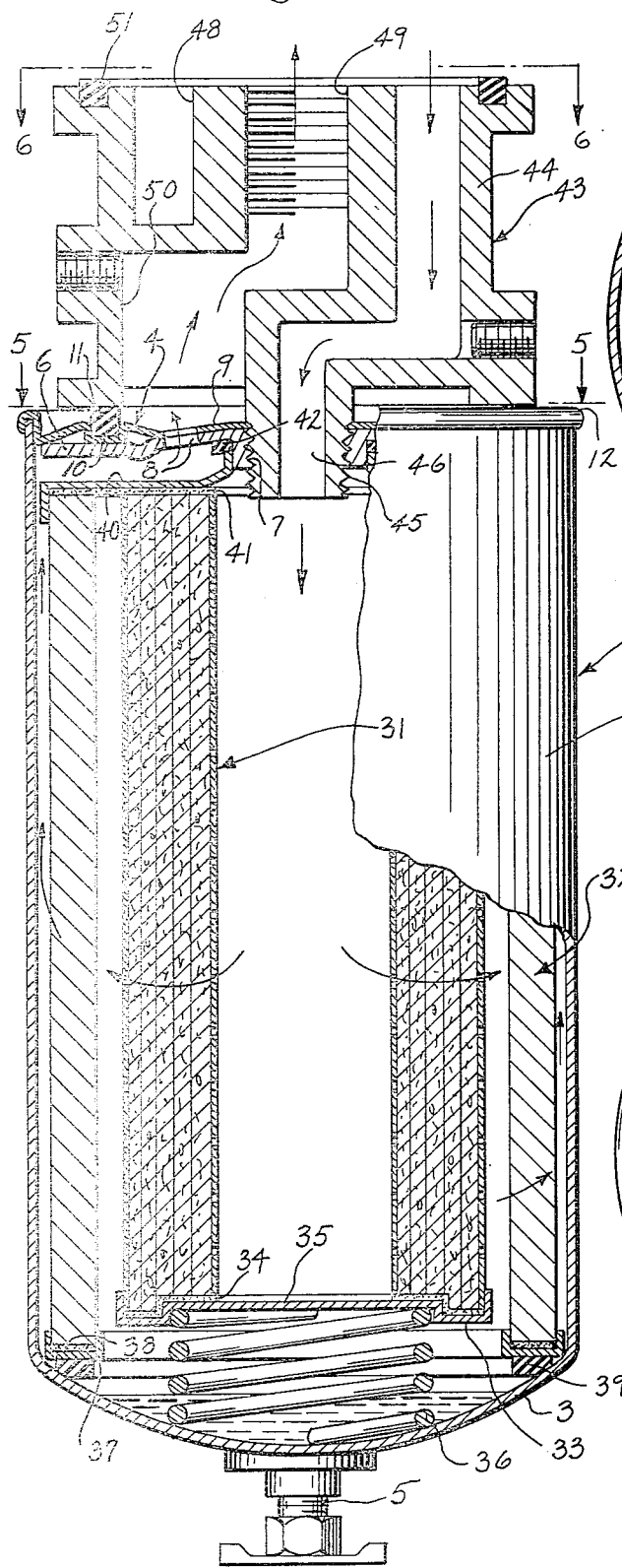
FIG. 4 is a side elevation of a modified form of the invention with parts broken away in which in-out flow is provided.
Figure 5:
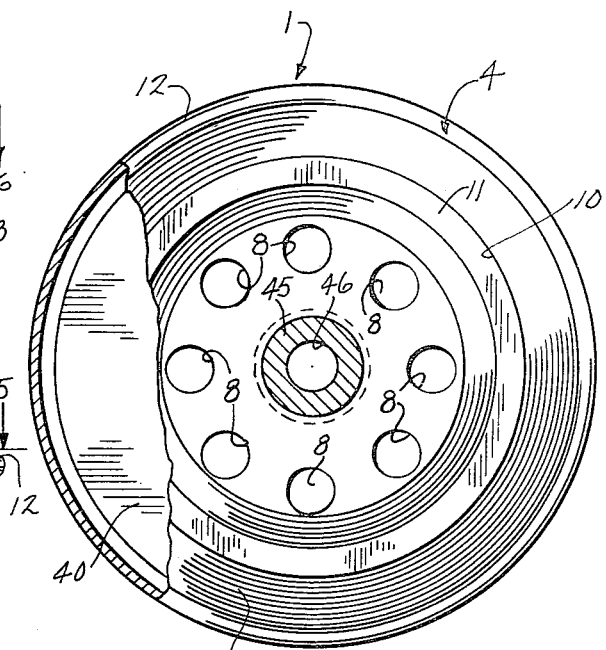
FIG. 5 is a section taken along line 5—5 of FIG. 4.
Figure 6:
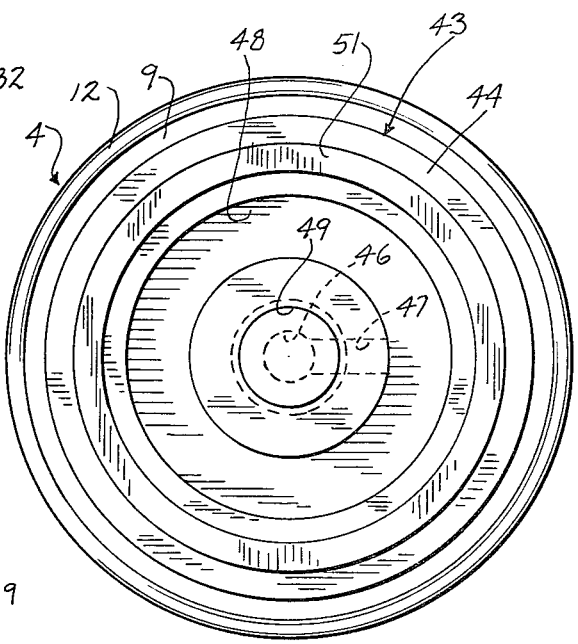
FIG. 6 is a section taken along line 6—6 of FIG. 4.

In assembling the separating device of FIGS. 4-6, the lower end of the coalescing assembly 31 is bonded to the lower end cap 33 and the lower end of the separator stage 32 is bonded within the channel-shaped ring 37 by the adhesive 38. The gasket 39 is applied to the lower surface of the ring 38 via an adhesive. Subsequently, the upper ends of both the coalescing assembly 31 and the separator stage 32 are bonded to the lower surface of the upper end cap 40 by adhesive layer 41. This pre-assembled unit is then introduced into the casing and the concave lower head in conjuction with the gasket 39 ensures that the unit will be properly centered within the casing.

Cover assembly 4 is then applied to the open end of the casing and the peripheral edge 12 of the retainer 9 is crimped around the upper edge of the casing to complete the assembly. During crimping, a tight seal is effected between gasket 42 and flange 41 of upper end cap 40.

As the flow in the separating device of FIGS. 4-6 is radially outward, an adapter 43 can be utilized in order to conform the flow to that of the fluid system of the engine block. The adapter 43 includes a body 44 having an externally threaded nipple which extends downwardly from the body and is adapted to be threaded into the central opening 7 of the cover assembly 4. Nipple 45 defines a passage 46 which communicates via lateral passage 47 with an annular groove 48 in the upper surface of the body. Groove 48 is adapted to be in communication with a series of openings in the engine block through which the fuel is delivered into the annular groove and thus through the passage 46 into the opening 7.

As shown in FIG. 4, the upper end of the body 44 is provided with a central internally threaded passage 49 which is located radially inward of the annular groove 48 and axial passage 49 communicates with a generally circular groove 50 formed in the lower surface of the body. Groove 50 is interrupted by lateral passage 47 Groove 50 communicates with the series of outlet openings 8 in the cover assembly so that fuel being discharged from the separator will flow upwardly through the openings 8 into the groove 50 and will be returned to the engine block through the passage 49.

The upper surface of the body 44 is formed with a groove which receives a gasket 51 that seals the body against the engine block when the adapter is threaded onto the engine block nipple.

The invention provides a low cost, disposable, liquid separating device, having particular use for removing water from hydrocarbon fuel. The separating device can be utilized in either an in-out flow, in which the flow is radially outward, or an out-in flow in which the flow is radially inward within the casing.

The separator device can be used in conjunction with various types of internal combustion engines, such as those employed in trucks, tractors, automobiles, mobile equipment and the like.

Various modes of carrying out the invention are contemplated as being within the scope of the following claims particularly pointing out and distinctly claiming the subject matter which is regarded as the invention.

We claim:

1. A separating device for separating a material from a liquid, comprising a casing having an open end, a cover assembly enclosing the open end and including a liquid inlet conduit and a liquid outlet conduit, a first of said conduits being located axially of the casing and having a threaded connection for attachment to a liquid flow system, an annular primary separating unit disposed within the casing, an annular secondary separating unit disposed within the casing and located in spaced downstream relation to the primary separating unit to provide an annular chamber therebetween, a lower end cap structure secured to the lower ends of the separating units, an upper end cap structure secured to the upper ends of the separating units, said separating units, said lower end cap structure and said upper end cap structure comprising a pre-assembled integral unit, means for attaching the cover assembly to the open end of the casing, biasing means disposed between the central portion of lower end cap structure and the bottom portion of the casing for urging said integral unit upwardly toward said cover assembly, said lower end cap structure being spaced from the bottom of the casing to provide a sump, drain means disposed in the lower end cap structure and providing communication between said annular chamber and said sump, and an annular gasket disposed between the lower surface of the lower end cap structure and the bottom of the casing, said drain means disposed radially between said annular gasket and said biasing means, the bottom of said casing being provided with a downwardly and inwardly sloping peripheral portion and said annular gasket being disposed in engagement with said sloping portion, said gasket serving to seal the lower end cap structure to said bottom and said sloping portion serving to said in centering said pre-assembled integral unit within the casing.

2. The separating device of claim 1, wherein said upper cap structure is provided with a central annular flange, and said device includes a gasket disposed between the flange and said cover assembly.

* * * * *